Oct. 18, 1932.   M. H. TONCRAY   1,883,119
DOOR HANDLE MOUNTING
Filed Nov. 4, 1930
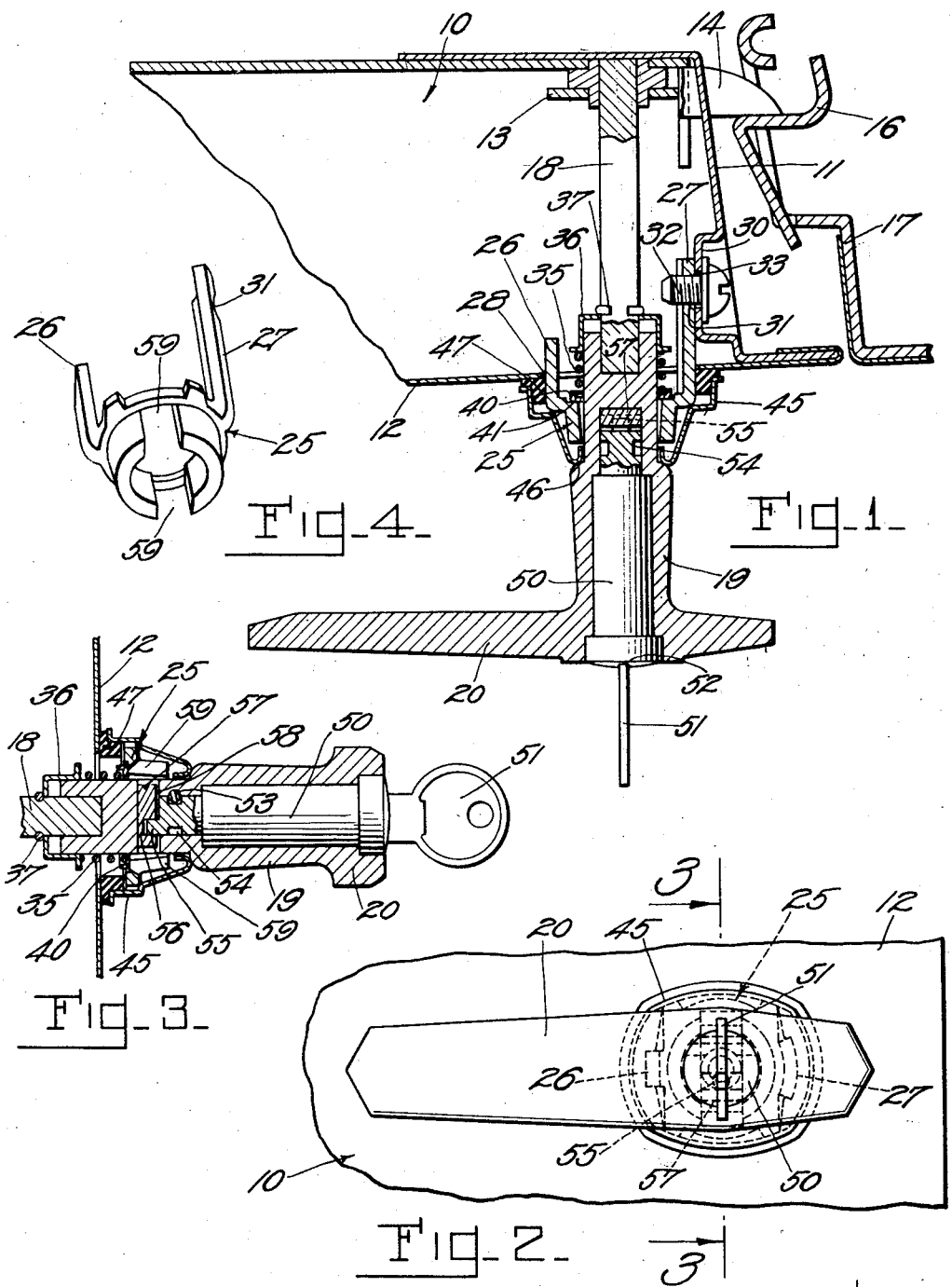
INVENTOR:
Millard H. Toncray
by Macleod Calver Copeland
Attys.

Patented Oct. 18, 1932

1,883,119

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

DOOR HANDLE MOUNTING

Application filed November 4, 1930. Serial No. 493,323.

This invention relates to door locks and particularly to automobile outside door handle and lock assemblies.

In automobile outside door handle and lock assemblies it has been common practice to secure the hub of the handle to the door latch spindle. A locking plate surrounded the hub of the handle and was prevented from rotating therewith by a pair of lugs which projected through holes in the outer door panel. A cylinder was mounted in the hub of the handle for rotation to move a lock bolt into engagement with a slot in the locking plate. An escutcheon plate surrounded the hub of the handle as well as the locking plate and was secured to the outer panel by a pair of screws. A spring surrounded the hub and had connections with the hub and the locking plate so as to urge the hub inwardly against the escutcheon plate. In order to prevent the removal of the hub, a retainer plate was secured to the latch housing and provided with a square hole of the same cross sectional area as that of the latch spindle. The opening in this retainer plate surrounded a groove in the latch spindle and was arranged so that when the latch was turned to locked position, the corners of the groove were adapted to engage the retaining plate to prevent removal of the hub and latch spindle.

It is an object of the present invention to provide an automobile outside door handle assembly of simplified construction, particularly in respect to the means for preventing withdrawal of the hub of the handle and which is so constructed that the hub cannot be withdrawn except when the door is opened.

Another object of the invention is the provision of an outside door handle assembly which is so arranged that the escutcheon plate is held snugly against the outer door panel by means not accessible from the outside of the door as are the direct connections between the same heretofore employed.

The invention will be more clearly understood from the following description in conjunction with the accompanying drawing, in which:

Fig. 1 is a fragmentary horizontal section of an automobile door through the lock and outside door handle assembly embodying the invention and showing the assembly in unlocked position.

Fig. 2 is an elevational view of the same.

Fig. 3 is a vertical section taken on the line 3—3 of Fig. 2.

Fig. 4 is a detail perspective view of one of the parts of the door handle assembly.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

One embodiment of the invention is illustrated in the accompanying drawing which shows an automobile door 10 of usual construction having a pillar 11 to which an outer panel 12 is secured. A latch housing 13 is suitably secured within the door 10 so that the bolt 14 may be moved through an opening in the pillar to engage a latch stop 16 carried by a door post 17. Suitable mechanism is provided within the housing 13 which is actuated by a latch spindle 18 of square cross section. The hub 19 of an outside door handle 20 projects through the outer panel 12 and is secured in the usual manner to the spindle 18. An annular locking plate 25 surrounds the hub 19 and is provided with projecting lugs 26 and 27, which pass through an opening 28 in the outer panel 12. The lug 27 extends adjacent the surface of a depression 30 in the face of the pillar 11 and is provided with a threaded opening 31 adapted to receive a screw 32 passing through an opening 33 in the depression 30.

A spring 35 surrounds the hub 19 with one end in engagement with a washer 36 held upon the latch spindle 18 by a spring key 37. The other end of the spring 35 engages a dished washer 40 and holds the same resiliently against a shoulder 41 upon the locking plate 25. An escutcheon plate 45 surrounds the hub 19 with its outer edge in engagement with a shoulder 46 upon the hub 19. The inner edge of the plate 45 engages a grommet 47 of rubber or other soft material resting against the outer surface of the outer panel 12.

A cylinder 50 is rotatably mounted within the hub 19 and may be turned by a key 51 adapted to be inserted in a key hole 52 therein. The cylinder 50 is retained in the hub 19 by a pin 53 engaging an annular groove 54 in the cylinder 50 and held securely in the hub 19. The inner end of the cylinder 50 is provided with a pin 55 eccentrically positioned thereon and adapted to engage a slot 56 in a locking bolt 57 slidably mounted in a guideway 58 in the hub 19 and which may be moved into and out of engagement with openings 59 in the locking plate 25.

The spring 35 acts upon the hub 19 to urge the escutcheon plate 45 inwardly into engagement with the grommet 47 resting against the outer surface of the panel 12. At the same time the engagement of the washer 40 with the locking plate 25 prevents withdrawal of the hub 19 inasmuch as the plate 25 is fixed to the pillar 11 by the screw 32 which is not accessible when the door is in closed position. This construction renders it unnecessary to secure the escutcheon plate to the outer door panel. Inasmuch as the locking plate 25 is secured to an inner face of the pillar, such as that adjacent the door post 17, the hub 19 cannot be withdrawn except by removing the screw 32 when the door is open. The term "inner face" is intended to include any surface of the door other than the outer surface, that is, a face not accessible when the door is closed.

I claim:

1. The combination with a door post, of a door having a pillar with its face adjacent said post when said door is in closed position, a latch spindle, a handle hub secured to said spindle, a locking plate surrounding said hub and means cooperating with said plate and hub to prevent withdrawal of said hub including a screw accessible from the face of said pillar.

2. The combination with a door having a pillar, of a latch spindle having a substantially uniform cross section, a handle hub secured to said spindle, a locking plate surrounding said hub and fixed to said pillar, and means movable axially with said hub for preventing withdrawal of said hub past said locking plate while permitting rotation of said hub.

3. The combination with a door post, of a door having a pillar with its face adjacent said post when said door is in closed position, a latch spindle, a handle hub secured to said spindle, a locking plate surrounding said hub, a screw passing through the face of said pillar and secured to said plate, the face of said pillar having a depression to receive the head of said screw, and means cooperating with said plate and hub to prevent withdrawal of said hub.

4. The combination with a door post, of a door having a pillar with its face adjacent said post when said door is in closed position, an outer panel secured to said pillar, a latch spindle, a handle hub secured to said spindle having a shoulder, a locking plate surrounding said hub, means for securing said plate to the face of said pillar, an escutcheon plate adapted to engage said shoulder, and a spring having connections with said locking plate and hub and adapted to act upon said hub to urge said escutcheon plate toward said outer panel.

5. In combination, a door pillar having a depression, an outer panel secured to said pillar, a handle assembly including a locking plate having a lug projecting through said panel adjacent the depression in said pillar, and means for securing said lug to said pillar.

6. In combination, a door, a latch spindle carried by said door and having an outside handle, locking means for said latch spindle including a stationary member to which said spindle is locked, and means accessible only from a portion of said door which, in turn is accessible only when said door is open, for securing said member to said door.

7. In combination, a door, a latch spindle carried by said door and having an outside handle, locking means for said latch spindle including a stationary member to which said spindle is locked, and means accessible only from a portion of said door which, in turn is accessible only from an inner face thereof, for securing said member to said door.

8. In combination, a door post, a door having an edge portion closing against said post, a latch spindle carried by said door and having an outside handle, locking means for said latch spindle including a stationary member to which said spindle is locked, and means accessible only from the edge portion of said door for securing said member to said door.

9. In combination, a door post, a door having an edge portion closing against said post, a latch spindle carried by said door and having an outside handle hub, locking means for said latch spindle including a member to which said spindle is locked, means accessible only from the edge portion of said door for securing said member to said door, and an escutcheon plate enclosing said member and held in place thereover by said handle hub.

In testimony whereof I affix my signature.

MILLARD H. TONCRAY.